US012422761B2

(12) United States Patent
Kobayashi et al.

(10) Patent No.: US 12,422,761 B2
(45) Date of Patent: Sep. 23, 2025

(54) FIXING MEMBER

(71) Applicant: CANON KABUSHIKI KAISHA, Tokyo (JP)

(72) Inventors: Noriaki Kobayashi, Ibaraki (JP); Naoki Akiyama, Ibaraki (JP); Hiroto Sugimoto, Ibaraki (JP); Hiroki Muramatsu, Tokyo (JP); Akeshi Asaka, Chiba (JP); Yasuhiro Miyahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 17/871,776

(22) Filed: Jul. 22, 2022

(65) Prior Publication Data

US 2023/0031631 A1 Feb. 2, 2023

(30) Foreign Application Priority Data

Jul. 28, 2021 (JP) ................................. 2021-123508

(51) Int. Cl.
*G03G 15/20* (2006.01)
*G03G 9/08* (2006.01)

(52) U.S. Cl.
CPC ....... *G03G 9/0819* (2013.01); *G03G 15/2053* (2013.01)

(58) Field of Classification Search
CPC ........... G03G 15/2053; G03G 15/2057; G03G 2215/2035; G03G 9/0819
See application file for complete search history.

(56) References Cited

U.S. PATENT DOCUMENTS

| | | | | |
|---|---|---|---|---|
| 2014/0348559 A1* | 11/2014 | Miyahara | G03G 15/2057 | 399/329 |
| 2018/0032004 A1* | 2/2018 | Miyahara | G03G 15/2057 | |
| 2022/0066370 A1* | 3/2022 | Asaka | G03G 15/2057 | |

FOREIGN PATENT DOCUMENTS

| | | | |
|---|---|---|---|
| JP | S63313182 | A | 12/1988 |
| JP | H02157878 | A | 6/1990 |
| JP | 2002258648 | A | 9/2002 |
| JP | 2005121825 | A | 5/2005 |
| JP | 2007240845 | A | 9/2007 |
| JP | 2014228729 | A | 12/2014 |
| WO | 2005054960 | A1 | 6/2005 |

* cited by examiner

*Primary Examiner* — Sophia S Chen
(74) *Attorney, Agent, or Firm* — Canon U.S.A., Inc. IP Division

(57) ABSTRACT

A fixing member includes a slide layer having a cylindrical shape and a thickness of 8 micrometers (μm) or more and 20 μm or less, a base layer formed on an outer side of the slide layer, and a surface layer formed on an outer side of the base layer. The slide layer has Benard convection cell structure having an average diameter of 50 μm or more and 200 μm or less on a surface that is not in contact with the base layer, and the slide layer includes an additive having a median particle diameter D50 of 4.5 μm or less and an aspect ratio of 30 or more and less than 50.

4 Claims, 5 Drawing Sheets

SCHEMATIC DIAGRAM OF FIXING BELT THAT IS USED IN PRESENT EXEMPLARY EMBODIMENT (IF CYLINDRICAL BASE BODY IS MADE OF METAL)

SCHEMATIC SECTIONAL VIEW OF IMAGE FORMING APPARATUS THAT IS USED IN PRESENT EXEMPLARY EMBODIMENT

SCHEMATIC SECTIONAL VIEW OF FIXING DEVICE
THAT IS USED IN PRESENT EXEMPLARY EMBODIMENT

SCHEMATIC DIAGRAM OF FIXING BELT THAT IS USED IN PRESENT EXEMPLARY EMBODIMENT (IF CYLINDRICAL BASE BODY IS MADE OF METAL)

FIXING MEMBER

BACKGROUND OF THE INVENTION

Field of the Invention

The present disclosure relates to a fixing member to be used in a heat fixing device of an electrophotographic image forming apparatus.

Description of the Related Art

Fixing devices for electrophotographic apparatuses typically employ a fixing roller method. However, a high heat capacity of a fixing roller causes time-consuming heating, a long waiting time at start-up, and a large power consumption. Thus, fixing devices employing a belt heating method that uses a fixing belt having a low heat capacity are used. Such a method is employed as an on-demand method that enhances heat transfer efficiency and achieves fast start-up of the device.

A belt fixing device as discussed in each of Japanese Patent Application Laid-Open No. 63-313182 and Japanese Patent Application Laid-Open No. 2-157878 includes, for example, a ceramic heater as a heating member that is firmly supported, and a fixing belt as a heat transfer member that slides against the heating member. The belt fixing device also includes an elastic pressing roller as a pressing member that forms a fixing nip portion with the fixing belt. The fixing belt device applies heat and pressure to a recoding material bearing an unfixed toner image in the fixing nip portion to fix the toner image on the recording material.

The fixing belt includes at least a thin cylindrical base layer having a low heat capacity, a silicone rubber elastic layer, and a fluorine resin release layer as basic configurations. The silicone rubber elastic layer applies uniform pressure to a toner image and unevenness of a sheet at the time of fixing. The fluorine resin release layer maintains releasability with respect to toner. If a cylindrical base layer is made of heat resistant resin, an inner circumferential surface of the cylindrical base layer per se serves as a slide layer that slides against the heating member. If a cylindrical base layer is made of metal, such a cylindrical base layer often includes an inner surface slide layer made of heat resistant resin to maintain slidability with the heating member. Accordingly, a configuration is widely known in which the inner surface slide layer, the cylindrical base layer, the silicone rubber elastic layer, and the fluorine resin release layer are provided in order from an inner layer toward an outer layer.

The belt fixing device includes the heating member firmly supported in an inner portion of the fixing belt, and performs fixing when a member to undergo fixing and the fixing belt are nipped and conveyed between the heating member and the elastic pressing roller. Consequently, frictional wear occurs between the inner circumferential surface of the fixing belt and the heating member which is firmly supported. As a result, self-induced vibration called a stick-slip (hereinafter, referred to as a film noise) and torque-up, may occur as the inner circumferential surface of the fixing belt and the heating member withstand the friction for a longer time.

To deal with such cases, Japanese Patent Application Laid-Open No. 2014-228729 discusses addition of filler having slidability to a slide layer on an inner surface of a fixing belt. The addition of filler roughens the inner surface of the fixing belt to solve the potential disadvantages.

In addition, a technique for generating surface roughness by creating cells on an inner surface is discussed. According to the technique, in the process of forming resin of the slide layer by adding filler to generate inner surface roughness, Benard Marangoni convection is generated to create cells on an inner surface, and thereby surface roughness is generated.

The cells created by Benard Marangoni convection by using additive provide surface roughness. However, if an aspect of the additive is large, the surface roughness changes depending on a film thickness at the time of coating. Consequently, the roughness is not stable due to change in the thickness at the time of manufacturing. Moreover, non-uniform thickness at the time of manufacturing causes the whole inner surface slide layer of the fixing belt to have non-uniform surface roughness. This causes torque-up due to small roughness in one portion of the fixing belt and abrasion of the slide layer due to large roughness in one portion of the fixing belt.

The present disclosure is directed to a fixing device that can prevent torque-up in one portion of a fixing belt and abrasion of a slide layer in one portion of the fixing belt.

SUMMARY OF THE INVENTION

According to an aspect of the present disclosure, a fixing member includes a slide layer having a cylindrical shape and a thickness of 8 micrometers (μm) or more and 20 μm or less, a base layer formed on an outer side of the slide layer, and a surface layer formed on an outer side of the base layer. The slide layer has Benard convection cell structure having an average diameter of 50 μm or more and 200 μm or less on a surface that is not in contact with the base layer, and the slide layer includes an additive having a median particle diameter D50 of 4.5 μm or less and an aspect ratio of 30 or more and less than 50.

Further features of the present disclosure will become apparent from the following description of exemplary embodiments with reference to the attached drawings.

DESCRIPTION OF THE EMBODIMENTS

Although an exemplary embodiment of the present disclosure will be described, the scope of the present disclosure is not limited to the present exemplary embodiment. The present exemplary embodiment also includes those modified to the extent that the gist of the present disclosure is not impaired.

Figure 1:
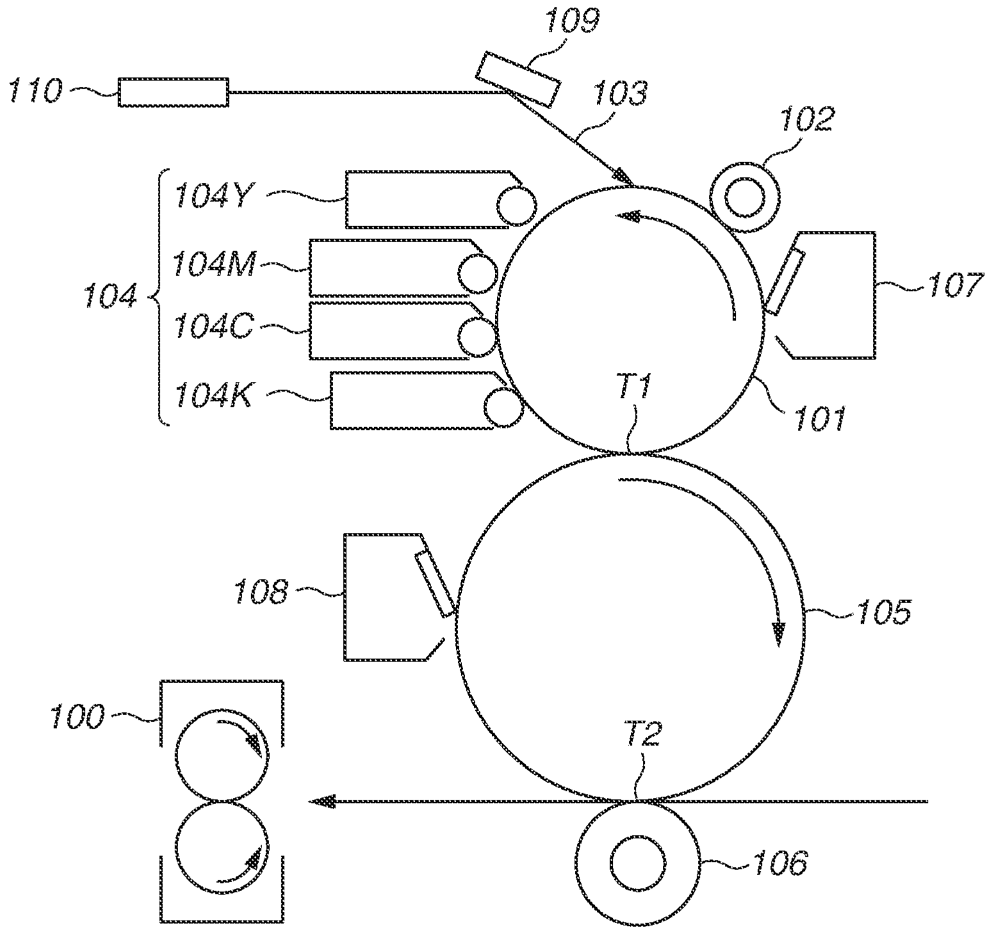
FIG. 1 is a schematic sectional view of an image forming apparatus that is used in the present exemplary embodiment.

(1) Schematic Configuration of Image Forming Apparatus:

FIG. 1 is a schematic sectional view of an image forming apparatus that is used in the present exemplary embodiment. A photoconductive drum 101 as an image bearing member is rotated at a predetermined process speed (a circumferential speed) in a counterclockwise direction indicated by an arrow illustrated in FIG. 1. The photoconductive drum 101, in the course of rotation, is charged with a predetermined polarity by a charging device 102, such as a charging roller.

The surface of the photoconductive drum 101 which has undergone the charging processing undergoes exposure processing by a laser beam 103 output from a laser optical system 110, based on input image information. The laser optical system 110 outputs the laser beam 103 modulated (on/off) in response to time-series electric digital pixel signals of target image information from an image signal generation apparatus, such as an image reading apparatus (not illustrated), thereby performing scanning exposure on the surface of the photoconductive drum 101. As a result, with such scanning exposure, an electrostatic latent image based on the image information is formed on the surface of the photoconductive drum 101. A mirror 109 deflects the laser beam 103 output from the laser optical system 110 to an exposure position of the photoconductive drum 101.

The electrostatic latent image formed on the photoconductive drum 101 is then rendered visible with yellow toner by a yellow development unit 104Y out of a plurality of development units in a development device 104. The yellow toner image is transferred to a surface of an intermediate transfer drum 105 in a primary transfer portion T1 serving as a contact portion between the photoconductive drum 101 and the intermediate transfer drum 105. A cleaner 107 cleans toner remaining on the surface of the photoconductive drum 101. The above-described process cycle of charging, exposing, developing, primary-transferring, and cleaning is similarly repeated to form a magenta toner image (by a development unit 104M), a cyan toner image (by a development unit 104C), and a black toner image (by a development unit 104K). The toner images of the respective colors and sequentially overlapped on the intermediate transfer drum 105 are secondarily transferred to a recoding material P in a collective manner in a secondary transfer portion T2 that is a contact portion between the intermediate transfer drum 105 and a transfer roller 106. A toner cleaner 108 cleans toner remaining on the intermediate transfer drum 105.

The toner cleaner 108 can be attached to and detached from the intermediate transfer drum 105, and is configured to be in a contact state with the intermediate transfer drum 105 only when the toner cleaner 108 cleans the intermediate transfer drum 105. The transfer roller 106 can also be attached to and detached from the intermediate transfer drum 105, and is configured to be in a contact state with the intermediate transfer drum 105 only at the time of secondary transfer. The recoding material P which has passed the secondary transfer portion T2 is introduced into a fixing device 100 serving as an image heating device, and fixing processing (image heating processing) is performed on the recording material P bearing an unfixed toner image. The recording material P which has undergone the fixing processing is discharged outside the image forming apparatus, and a series of image forming operations ends.

Figure 2:
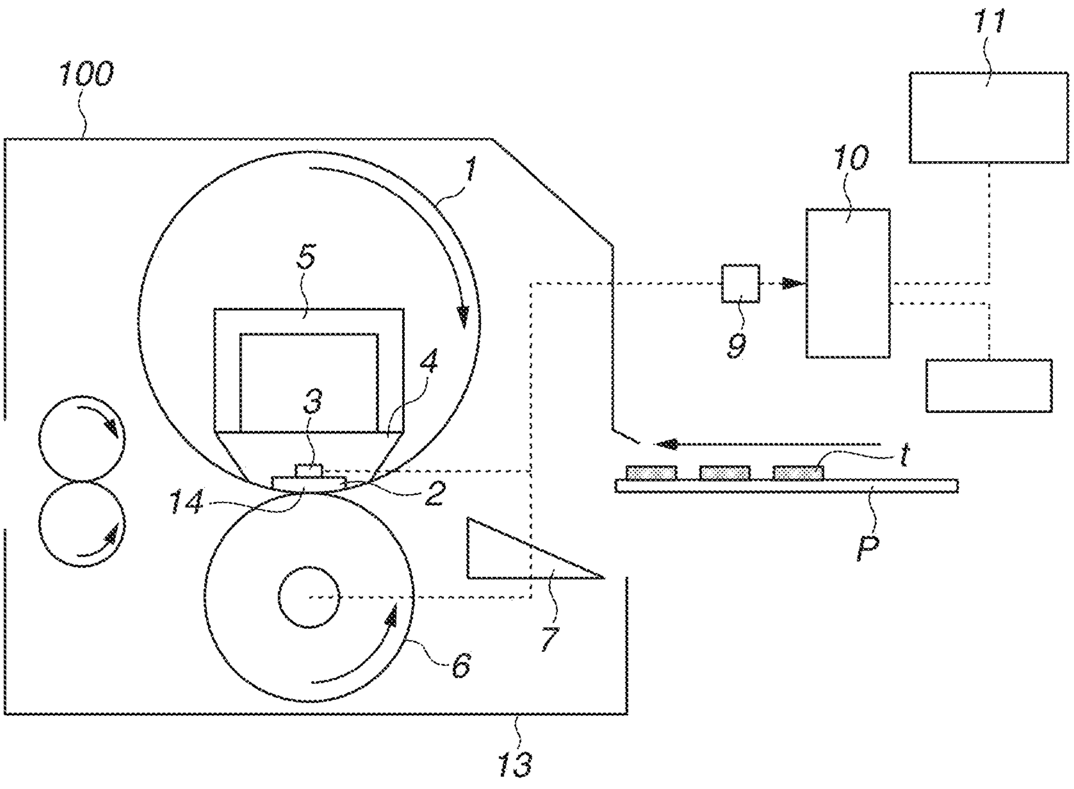
FIG. 2 is a schematic sectional view of a fixing device that is used in the present exemplary embodiment.

(2) Schematic Configuration of Fixing Device:

FIG. 2 is a schematic sectional view of the fixing device 100. The fixing device 100 includes a cylindrical fixing belt (endless belt) 1 having an elastic layer, a pressing roller 6 as a pressing member, a fixing heater 2 as a heating member, and a film-guide-cum-heater-holder 4 having heat resistance. The pressing roller 6 forms a fixing nip portion 14 between the fixing belt 1 and the pressing roller 6. The fixing heater 2 is firmly attached to a lower surface of the film-guide-cum-heater-holder 4 along a longitudinal direction of the film-guide-cum-heater-holder 4, and the fixing belt 1 and a heating surface of the fixing heater 2 are slidable.

The fixing belt 1 is fitted outside the film-guide-cum-heater-holder 4 with some degree of freedom. The film-guide-cum-heater-holder 4 is formed of liquid crystal polymer resin having high heat resistance. The film-guide-cum-heater-holder 4 holds the fixing heater 2, and has a function of causing the fixing belt 1 to be shaped to separate from the recording material P. The pressing roller 6 has a multi-layer structure in which a silicone rubber layer having a thickness of approximately 3 millimeters (mm) and a perfluoroalkoxy (PFA) resin tube having a thickness of approximately 40 micrometers (μm) are laminated in order on a cored bar made of stainless. Both end portions of the cored bar of the pressing roller 6 are rotatably held in a bearing manner between side panels (not illustrated) on the rear and the front of a device frame 13. A fixing unit including the fixing heater 2, the film-guide-cum-heater-holder 4, a fixing belt stay 5, and the fixing belt 1 are disposed above the pressing roller 6.

The fixing unit is disposed parallel to the pressing roller 6 with the fixing heater 2 facing downward. A pressing unit (not illustrated) urges each of both end portions of the fixing belt stay 5 toward the pressing roller 6 by a force of 156.8 N (16 kgf), that is, the fixing belt stay 5 is urged by a total pressure of 313.6 N (32 kgf). As a result, the lower surface (the heating surface) of the fixing heater 2 is pressed against an elastic layer of the pressing roller 6 via the fixing belt 1 with a predetermined pressing force, and the fixing nip portion 14 having a predetermined width that is required for fixing is formed. A thermistor 3 (a heater temperature sensor) as a temperature detection unit is disposed on a back surface (a surface opposite the heating surface) of the fixing heater 2 which is a heat source. The thermistor 3 has a function of detecting temperature of the fixing heater 2. The pressing roller 6 is driven to rotate at a predetermined speed in a direction indicated by an arrow illustrated in FIG. 2. The fixing belt 1 which is pressed against the pressing roller 6 is rotated at a predetermined speed by rotation of the pressing roller 6. Herein, an inner surface of the fixing belt 1 is rotated outside the film-guide-cum-heater-holder 4 in a direction indicated by an arrow illustrated in FIG. 2 while sliding in close contact with the lower surface of the fixing heater 2.

A semisolid lubricant described below is applied to the inner surface of the fixing belt 1 to obtain slidability between the film-guide-cum-heater-holder 4 and the inner surface of the fixing belt 1. The thermistor 3 is disposed so as to contact the back surface of the fixing heater 2, and is connected to a control circuit unit (also referred to as a central processing unit (CPU)) 10 as a control unit via an analog/digital (A/D) converter 9. The CPU 10 samples each of outputs from the thermistor 3 at a predetermined cycle, and reflects temperature information acquired by the sampling to temperature control. That is, the CPU 10 determines temperature adjustment control content of the fixing heater 2 based on the outputs of the thermistor 3. A heater drive circuit unit 11 serving as an electric power supply unit has a function of controlling power distribution to the fixing heater 2 such that a temperature of the fixing heater 2 becomes a target temperature (a set temperature). The CPU 10 also has a function of controlling fixing belt lifespan estimation sequence that is described below, and is connected to a drive motor of the pressing roller 6 via the A/D converter 9. A fixing heater includes an alumina circuit board and a resistance heating member on the alumina circuit board. The resistance heating member is provided by applying a conductive paste including silver-palladium alloy in a shape of film having a uniform thickness of approximately 10 μm to the alumina circuit board by using a screen printing method.

In addition, glass coating with pressure-resistant glass is performed on the resistance heating member, thereby providing a ceramic heater.

Figure 3:
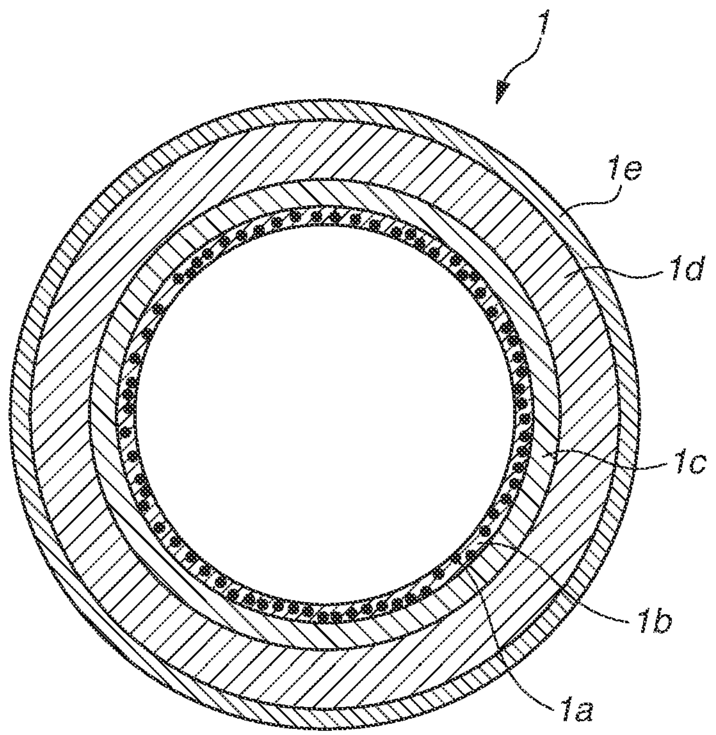
FIG. 3 is a schematic view of a fixing belt that is used in the present exemplary embodiment.

(3) Schematic Configuration of Fixing Belt:

FIG. 3 is a schematic diagram of the fixing belt 1 obtained by using the technique according to the present exemplary embodiment. The fixing belt 1 includes a cylindrical base layer 1*c*, an inner surface slide layer 1*b* arranged on an inner circumferential surface of the cylindrical base layer 1*c*, and a shape anisotropic filler 1*a* having a needle shape. The fixing belt 1 further includes a silicone rubber elastic layer 1*d* with which an outer circumferential surface of the cylindrical base layer 1*c* is covered, and a fluorine resin tube 1*e* as a fluorine resin surface layer. The inner surface slide layer 1*b* is arranged via an adhesive layer. The shape anisotropic filler 1*a* is blended into the inner surface slide layer 1*b* and arranged along longitudinal direction of the fixing belt 1. The silicone rubber elastic layer 1*d* is arranged via a primer layer. The fluorine resin tube 1*e* is arranged on the silicone rubber elastic layer 1*d* via a silicone rubber adhesive layer.

A more specific description is hereinafter given.

(4) Cylindrical Base Layer:

Since the fixing belt 1 has resistance to heat, the cylindrical base layer 1*c* preferably has heat resistance and bending resistance. For example, a material formed by nickel electroforming or a metal material, such as stainless steel, as discussed in Japanese Patent Application Laid-Open No. 2002-258648, WO05/054960, and Japanese Patent Application Laid-Open No. 2005-121825 can be used as a metal base layer. In the present exemplary embodiment, a type 304 stainless steel is used.

(5) Inner Surface Slide Layer

As for the inner surface slide layer 1*b*, resin having high durability and high heat resistance is suitable. Examples of such resin include polyimide resin, polyamide-imide resin, and polyether ether ketone resin. Particularly, polyimide resin is preferred from the aspects of ease of manufacturing, heat resistance, elastic modulus, and strength. In the present exemplary embodiment, polyimide resin is used as the inner surface slide layer.

For improvement of sliding performance, particles, such as graphite particles, molybdenum disulfide particles, and fluorine resin particles, are desirably added. From the aspects of ease of manufacturing, heat resistance, and lubricity, mica is preferred. In the present exemplary embodiment, mica is used as an additive.

(5-1) Polyimide Precursor Solution

A polyimide inner surface slide layer is formed by applying polyimide precursor solution to an inner surface of the cylindrical base layer. Subsequently, the inner surface on which the polyimide precursor solution has been applied is dried and then heated. Accordingly, the polyimide inner surface slide layer is formed by dehydration ring closure reaction. The polyimide precursor solution is acquired by reacting aromatic tetracarboxylic dianhydride or a derivative thereof with aromatic diamine having substantially the same amount of substance (in units of moles) as the aromatic tetracarboxylic dianhydride in an organic polar solvent.

Typical examples of aromatic tetracarboxylic acid include pyromellitic dianhydride, 3,3',4,4'-biphenyltetracarboxylic dianhydride, 3,3',4,4'-benzophenonetetracarboxylic dianhydride, and 2,3,6,7-naphthalenetetracarboxylic dianhydride. These aromatic tetracarboxylic acids can be used alone or in combination of two or more kinds.

Typical examples of the aromatic diamine include 4,4'-diaminodiphenyl ether, paraphenylene diamine, and benzidine. These aromatic diamines can be used alone or in combination of two or more kinds.

Examples of the aforementioned organic polar solvent include dimethyl acetamide, dimethylformamide, N-methyl-2-pyrrolidone, phenol, O-cresol, M-cresol, and P-cresol.

(5-2) Additive

As for the additive, a particle diameter needs to be selected to generate unevenness on a slide layer.

The particle diameter is preferably less than 4.5 nm from a viewpoint of generation of cells with respect to a slide layer film thickness of 8 μm to 20 nm.

In addition, a material having lubricating ability needs to be selected so that lubricity is provided to the slide layer. Moreover, since the additive is expected not only to have abrasiveness, but also not to induce abrasion of a slide-relating member in a case of elimination from the slide layer, a suitable hardness needs to be selected. In consideration of such conditions, a material, such as polytetrafluoroethylene (PTFE), graphite, molybdenum disulfide, and mica, is suitable as the additive.

(5-3) Formation of Polyimide Resin Slide Layer

Figure 4:
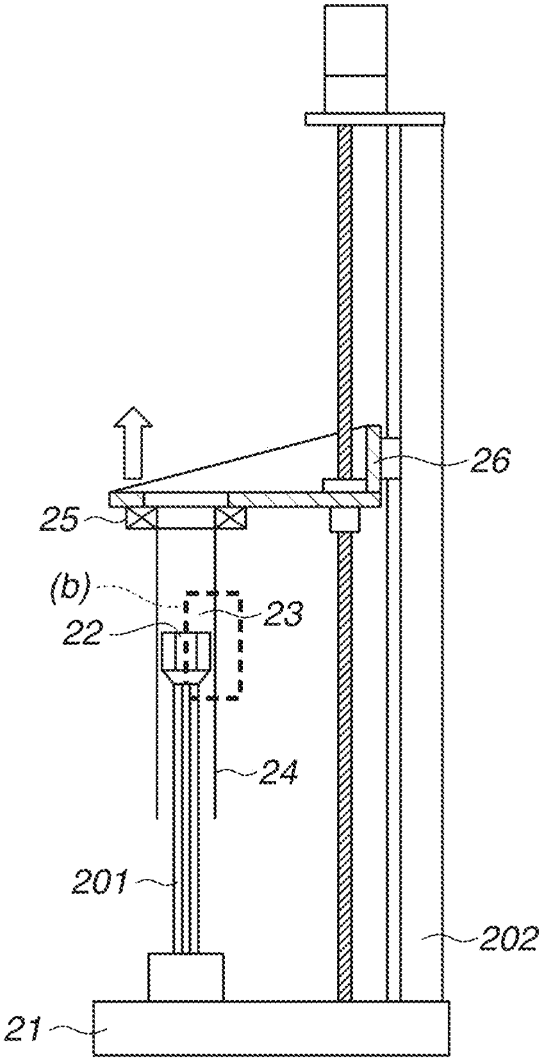
FIG. 4 is a schematic diagram of a ring coating device that is used in the present exemplary embodiment.

A method, such as a ring coating method, can be employed as a coating method. FIG. 4 is a schematic diagram of a coating device employing the ring coating method. Supporting posts 201 and 202 are disposed on a base 21. A coating head 22 is firmly attached to the supporting post 201, and a coating liquid supply device (not illustrated) is connected to the coating head 22.

On the supporting post 202, a work hand 25 that holds a cylindrical base layer 24 is formed on a workpiece moving device 26. The workpiece moving device 26 can vertically move by a motor disposed on the supporting post 202, and the work hand 25 formed on the workpiece moving device 26 can also vertically move by movement of the workpiece moving device 26.

On an outer periphery of the coating head 22, a slit (not illustrated) orthogonal to a cylindrical shaft is formed. A polyimide precursor solution 23 with which additive is mixed is evenly supplied from the slit, and the cylindrical base layer 24 is moved along the outer periphery of the coating head 22, so that an inner surface of the cylindrical base layer 24 is coated. In such a device, a thickness of the slide layer is determined depending on an amount of coating, and an optional amount of coating (an optional film thickness) can be acquired by changing clearance, a supply speed of the polyimide precursor solution 23, and a moving speed of the workpiece moving device 26.

After the coating, the cylindrical base layer with the coated inner surface is burned, for example, for 5 minutes to 30 minutes in a hot air circulation furnace at a temperature of 80° C. to 150° C. Then, after the solvent is dried, the resultant layer is burned for 5 minutes to 60 minutes in a hot air circulation furnace at a temperature of 200° C. to 240° C., and is further burned for 10 minutes to 60 minutes in a hot air circulation furnace at a temperature of 350° C. to 400° C. Thus, a uniform polyimide inner surface slide layer on which varnish bumps are prevented can be formed.

If polyimide resin is used for a cylindrical base layer per se, a manufacturing method of an inner surface slide layer is basically the same. There is a conventionally known manufacturing method, that is, polyimide precursor solution is applied to an outer surface or an inner surface of a cylindrical core, the polyimide precursor solution applied layer is dried, and then the dried layer is cured with heat (imidized) in a state in which the layer is attached to a surface of the core. Alternatively, when the polyimide precursor solution applied layer is solidified to have a strength at which a structure as a tube can be retained, the applied layer may be removed from the core surface. In such a case, then, a heat curing method is performed to form a polyamide inner surface slide layer.

(Sample)

An additive according to the present exemplary embodiment is described. In the present exemplary embodiment, mica MK-100 (available form Katakura & Co-op Agri Corporation) was used as the additive. MK-100 had an aspect ratio of 30 to 50, and had particles having a median particle diameter D50 of 4.5 μm. In the present exemplary embodiment, where 100 parts of polyimide precursor solution was provided, 4.5 parts of mica amount was added. As for the polyimide precursor solution, a mixture of U-Varnish-A, U-Varnish-S301, and U-Varnish-S (available from UBE Corporation) at a ratio of 5:3:2 was used. After coating was performed, the cylindrical base layer with the coated inner surface was burned, for example, for 5 minutes in a hot air circulation furnace at a temperature of 150° C. to dry solvent. Subsequently, the resultant layer was burned for 60 minutes in a hot air circulation furnace at a temperature of 200° C., and then was burned for 60 minutes in a hot air circulation furnace at a temperature of 350° C. Thus, a polyimide resin slide layer was formed.

Figure 5:
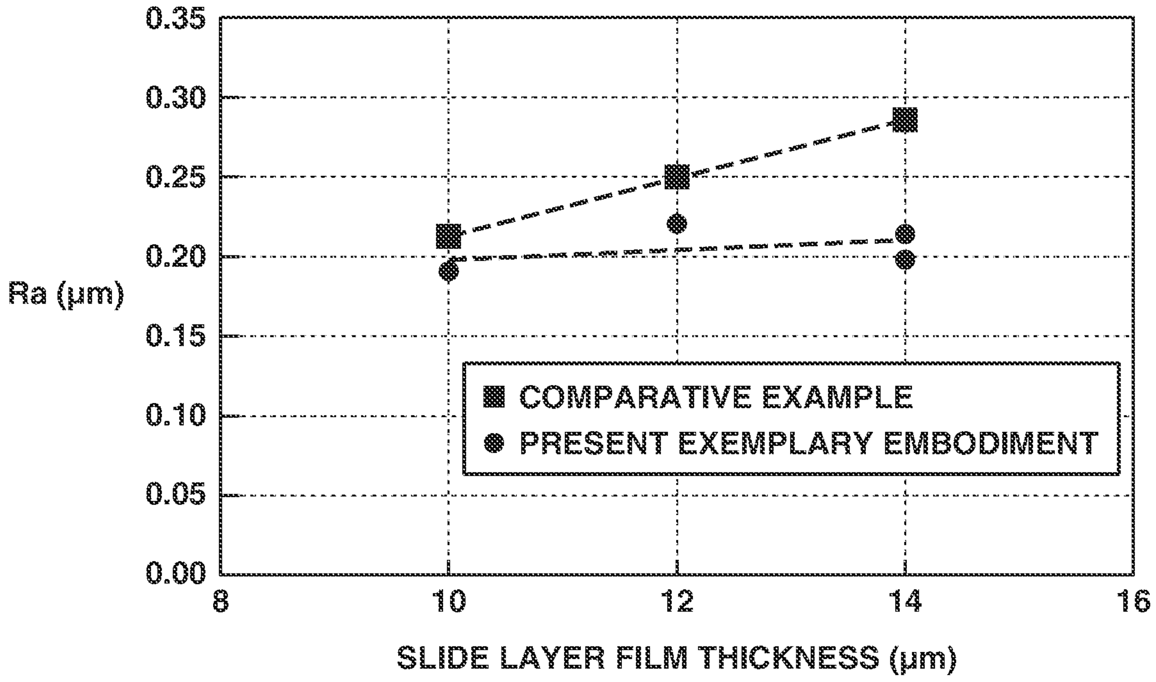
FIG. 5 is a diagram summarizing specifications of the present exemplary embodiment.

FIG. 5 illustrates an evaluation result of the present exemplary embodiment. PDM-5B (available from Topy Industries Limited) that had an aspect ratio of 50 or more and had particles having a median particle diameter D50 of 5 μm was used as a comparative example. Burning conditions for the comparative example were substantially the same as those for the present exemplary embodiment. FIG. 5 illustrates a result of a surface roughness Ra when a thickness of the above-described slide layer is changed to 10 μm, 12 μm, and 14 μm. A surface roughness Ra of the comparative example tends to increase as a thickness increases, whereas a surface roughness Ra according to the present exemplary embodiment does not depend on a thickness and remains constant.

As described above, a fixing belt of the present exemplary embodiment and a fixing belt of the comparative example are manufactured and evaluated, so that it is ascertained that roughness of an inner surface can be uniformed without depending on a thickness of a slide layer.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-123508, filed Jul. 28, 2021, which is hereby incorporated by reference herein in its entirety.

What is claimed is:

1. A fixing member comprising:

a slide layer having a cylindrical shape and a thickness of 8 μm or more and 20 μm or less;

a base layer formed on an outer side of the slide layer; and a surface layer formed on an outer side of the base layer, wherein the slide layer has Benard convection cell structure having an average diameter of 50 μm or more and 200 μm or less on a surface that is not in contact with the base layer, and the slide layer includes an additive having a median particle diameter D50 of 4.5 μm or less and an aspect ratio of 30 or more and less than 50.

2. The fixing member according to claim 1, wherein the additive is made of mica.

3. The fixing member according to claim 1, wherein the slide layer is polyimide resin.

4. The fixing member according to claim 1, wherein the additive is 5% by weight or more and 40% by weight or less with respect to a resin portion of the slide layer.

* * * * *